United States Patent
Zeman

[15] 3,646,699
[45] Mar. 7, 1972

[54] ARTIFICIAL FISH LURE

[72] Inventor: Jack R. Zeman, P.O. Box 10, 167 Wilton Manor Branch, Ft. Lauderdale, Fla. 33305

[22] Filed: Feb. 27, 1970

[21] Appl. No.: 15,128

[52] U.S. Cl. ................................................................43/35
[51] Int. Cl. ........................................................A01k 83/02
[58] Field of Search.....................................................43/35

[56] References Cited

UNITED STATES PATENTS

| | | |
|---|---|---|
| 345,088 | 7/1886 | Van Normann..........................43/35 |
| 1,268,097 | 6/1918 | Crandall....................................43/35 |
| 1,391,030 | 9/1921 | Wheeler....................................43/35 |

Primary Examiner—Samuel Koren
Assistant Examiner—Daniel J. Leach
Attorney—Ephraim Banning, III

[57] ABSTRACT

An elongated lure body having a pivotal mounting for one end of a conventional hook shank, the shank being swingable through 90° or more between a retracted position adjacent to the lure body and parallel therewith and an extended position in which the hook is disposed well away from the lure body. Spring means is associated with the hook to bias the hook to the extended position. A spring-biased catch, is mounted on the lure body and has a locking bolt movable from a tensioned cocked position blocking the movement path of the shank and frictionally engaging the shank to a relaxed position wherein it is disengaged from the shank to permit outward swinging movement of its hook end to a fish-impaling position. Triggering of the catch is caused by a striking fish applying opposing pressures to the lure body which reduces the frictional pressure between the catch and shank to free the shank for swinging movement to the fish-impaling position.

7 Claims, 9 Drawing Figures

PATENTED MAR 7 1972 3,646,699
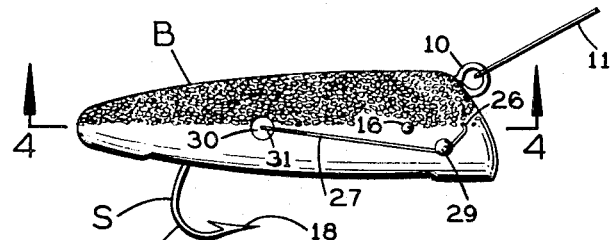
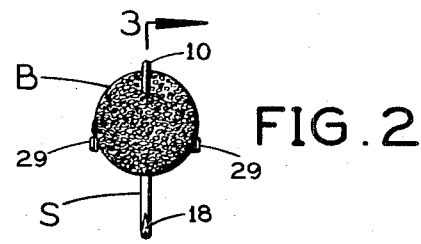
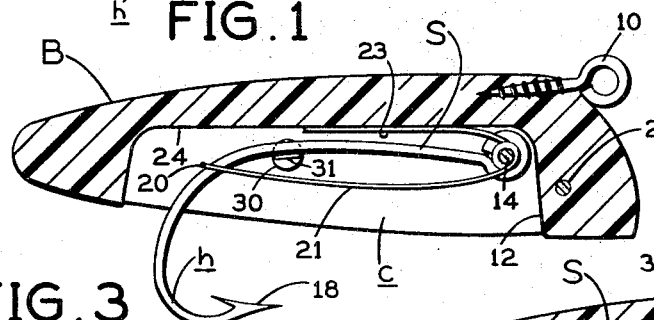
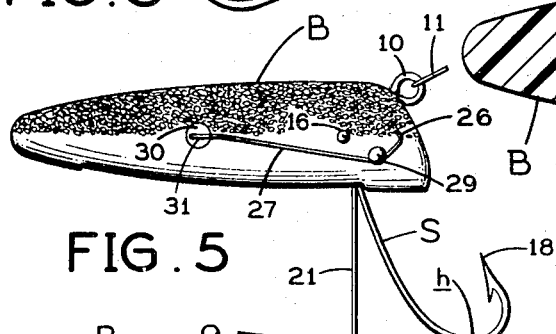
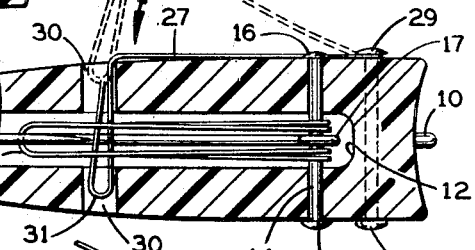
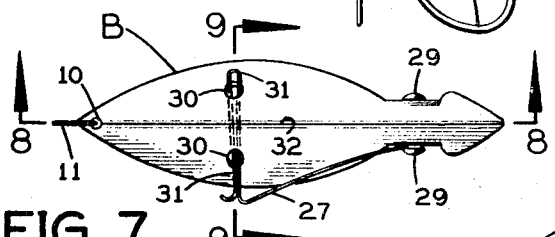
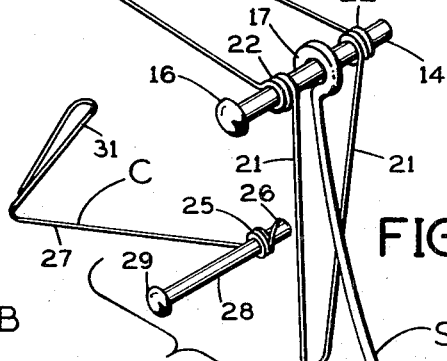
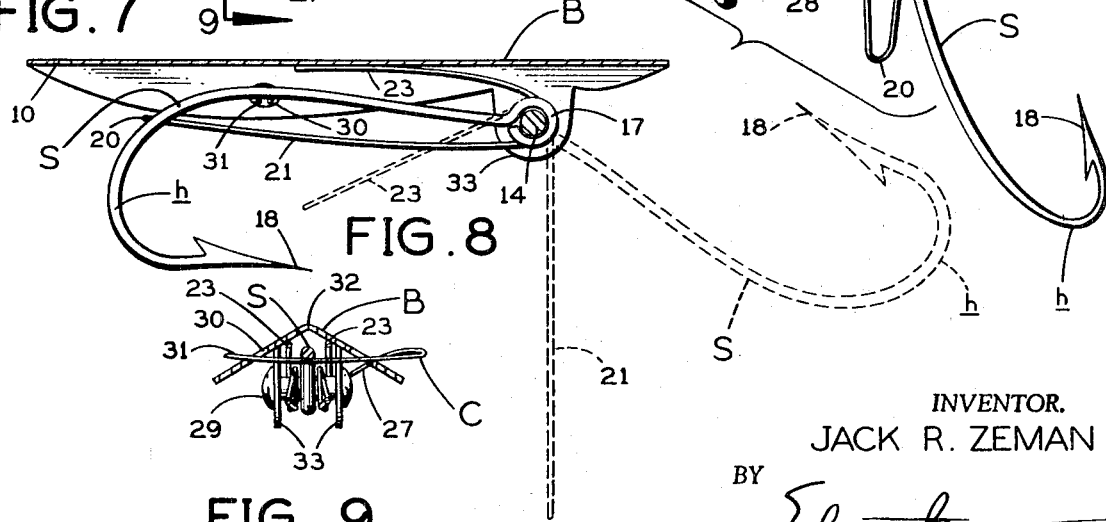
INVENTOR.
JACK R. ZEMAN
BY
Ephraim [signature]
ATTORNEY

ARTIFICIAL FISH LURE

This invention relates to an artificial fish lure having a one piece body of conventional type, such as a plug or a spoon. To such a body is pivotally mounted the eye at one end of the shank of a conventional fishhook whereby its free hook end may swing out and away from the lure body to a fish-impaling position in response to associated spring means. Normally, the shank is blocked from so moving by a spring catch which is advanced into the movement path of the shank. When and if the shank be pressed toward the body, as when a fish mouths the lure, opposite pressures from the fish jaws then cause a triggering of the catch whereby to release the shank for a fast outward swinging movement of its hook end portion. Its hook is then advanced to a fish-impaling position to facilitate capture of the fish. Triggering of the catch is very sensitive and reliable, requiring only light opposite pressures to be applied by an impaled fish. It is largely the shank-catch relationship, their construction and their operation, which assures the release of the shank to its fish-impaling position in response to mouthing of the lure, which constitutes the principal feature of this invention.

In the description to follow, reference is made to two kinds of lures, one of the plug type and the other of the spoon type, each being equipped with the hook-catch mechanism of this invention. Illustrations thereof, embodying the present invention, are contained in the accompanying drawing wherein -

FIG. 1 is a side elevation of a plug-type of bait in which the barbed hook is shown in its retracted position ready to spring out in response to the strike of a fish;

FIG. 2 is an elevational view of the front end thereof;

FIG. 3 is a longitudinal section therethrough, taken on line 3—3 of FIG. 2, the catch being shown in hook-engaging position;

FIG. 4 is a similar view, taken on the line 4—4 of FIG. 1, showing in dotted lines the position of the catch when sprung to hook-disengaging position;

FIG. 5 which is a view similar to FIG. 1 shows the barbed hook end portion of the shank sprung out to fish-impaling position following its disengagement from the catch;

FIG. 6 is a perspective exploded view of the shank and the trigger operating means therefor;

FIG. 7 is a bottom (or top) elevational view of a spoon type of one-piece lure body embodying the hook-catch mechanism elsewhere shown;

FIG. 8 is a longitudinal section through the lure of FIG. 7, taken on line 8—8 thereof, showing in elevation the shank in its retracted position and, in dotted lines, the hook in fish-impaling position and the biasing means for the shank; and FIG. 9 is a sectional view, transversely of the lure of FIG. 7, taken on line 9—9 thereof.

The plug type of lure, shown in FIGS. 1-6, will first be considered. Its elongated one-piece body B may be conventionally contoured with an eye 10 affixed to its forward end for attachment thereto of the usual line 11. Formed in such a body, and open along its bottom, is an elongated chamber c closed by a wall 12 at its forward end. Extending crosswise through the chamber, near this wall, is a pivot pin 14 which traverses the spaced lure walls on opposite sides of the chamber. Heads 16 are formed at opposite ends of this pin to engage external faces of the body, whereby to lock the pin axially in place.

A fishhook having a shank S is provided with an eye 17 at one end to receive the pin 14, and at its other end with a curved portion extending through 180° or so to form a barbed hook h. The hook is pointed at 18 to face in a forward direction. Such a shank with barbed hook at one end is entirely conventional. Its pivotal mounting on the pin 14 permits it to swing upwardly to a position within the chamber c with only the barbed pointed end of the hook h remaining exteriorly thereof. This hook end portion, which is usually straight for a short distance, is then slightly spaced away from the bottom of the lure body and substantially parallel therewith.

A biasing means for the shank is also provided. This may consist of a spring wire which is bent upon itself to form a loop 20 from which extends a pair of arms 21 provided with two sets of side-by-side coaxial coils 22 to receive therethrough the pin 14. Beyond the two sets of coils the arms are extended forwardly in the form of parallel limbs 23 which are adapted to engage the chamber roof 24. Between the two sets of coils 22 is fitted the shank eye 17 whereby to complete the pivotal mounting therefor. The looped end 20 of this spring traverses the movement path of the shank and engages the shank. With the spring limbs 23 engaging the chamber roof 24 and the spring loop 20 engaging the shank at a point well removed from its pivotal mounting, a tension force of considerable magnitude is created, tending to swing the shank and hook outwardly and away from the lure body.

To control all such movements, a releasable catch C is employed. In a tensioned state it acts to restrain the shank S and hook h from swinging away from the lure body in response to its own biasing means, then in a condition of maximum tension. In the form shown, this catch C, also of spring wire, is provided at one end with a coil (or coils) 25 terminating in a projecting tail 26. Through each coil (or coils) is extended an anchor pin which may be the pivot pin 14 or a separate pin 28 disposed forwardly of the pivot pin. Heads 29 shown on such a pin are engageable with opposite faces of the body to lock this pin axially in place and thereby the catch as well. The coil tail 26 engages fixedly with the lure body adjacent the outer face of which the catch extends rearwardly at 27 to a point oppositely of two aligned guide openings 30 which traverse opposite walls of the body. There the catch is bent through 90° or so to form, in effect, a locking bolt 31 which is extended crosswise of the lure body to lie within the two guide openings where it is slidingly supported in a position which traverses the movement path of the shank at a point well removed from its pivoted end. The catch is shown as doubled upon itself where the bolt is formed, thereby to provide two contact points for simultaneous engagement with the under side of the shank when the latter is swung upwardly close to, but slightly spaced from, the chamber roof 24.

With a shank and bolt so formed and assembled, the shank will extend past one side of the locking bolt (FIG. 3) to be frictionally engaged thereby and restrained from downwardly swinging movement in response to its own biasing means. This bolt which is movable axially of the two guide openings 30 is itself biased sufficiently for the catch (of which it is a part) to retract and move away from the shank, thereby withdrawing itself from the movement path of the latter, when free to do so. The only restraint to any such movement is provided by the relatively strong biasing force which holds the shank frictionally against one side of the bolt with a sufficient pressure to normally prevent any endwise movement thereof. Once this pressure engagement between the shank and catch be reduced or eliminated, any remaining frictional contact of one with the other will no longer suffice to restrain movement of the shank thereafter. This is due to the latter's superior biasing force which is then free to assert itself. As a result, the shank is released to execute a fast swinging movement downwardly and away from the lure body to its fish-impaling position therebelow. Such a pressure reduction or elimination normally takes place in response to very moderate opposing pressures if applied to the lure body and to the shank hook end, as when a striking fish mouths the lure between its two jaws.

The restraint to shank movement provided by frictional engagement of the locking bolt therewith is one which is very sensitive, thereby adapting it peculiarly for use in a fishing lure, as already noted. The cross section, form, and construction of the catch and its bolt may be varied considerably so long as (1 the bolt is readily movable into and out of the movement path of the shank, and (2) the biasing force of the latter is sufficiently strong to initiate movement of itself once its frictional contact with the catch is reduced. In its fish-impaling position, the shank will have swung outwardly and downwardly through 90° or more, to a limit stop provided by the end wall 12 of the chamber. The biasing force of the spring arms 21 and limbs 23 need not remain effective throughout all of this distance, but should be fully operative, when first triggered, to swing the shank outwardly, both promptly and rapidly. The shank is free to separate form the looped end 20 of the catch (FIG. 3), but only after completion of its swing through an effective distance tending to impale a striking fish.

The lure of FIGS. 7-9 is much the same as the one already described. The one difference, which is minor, is that its body B is of the spoon type, instead of a plug. Even so, the shank S, the catch C, and the mountings therefor may be substantial duplicates for the two types of bodies. Accordingly, reference characters have been applied to parts in FIGS. 7-9 the same as those applied to similar parts elsewhere in the drawing. The position of the lure body in FIGS. 7-9 is also the same as that elsewhere illustrated, i.e., the shank and catch are disposed upon the under side of the lure body so that in such position the relative terms "top," "bottom," etc., will carry the same meaning as in FIGS. 1-6. It may be noted, moreover, that the illustrated position of the spoon bait is a normal one, although perhaps not the one most usual in practice.

Referring specifically to FIGS. 7-9, the spoon type of lure body B is conventional in that it is bowed upwardly endwise, and crowned upwardly crosswise as by a wide angle 32 extending longitudinally between its two ends. The two sloping flat body sections thus provided define between them a semienclosed space for accommodation of the shank S and catch C. As shown in FIG. 7, the perimetric contour of the elongated spoon body is tapered outwardly from its opposite ends to a medial point thereof where its width is greatest. The front end of the spoon body is eyed at 10 for attachment of a line 11 thereto. Near its rear end a pair of spaced ears 33 are depended from opposite sides of the spoon body to support between them a pivot pin 14 which traverses the eye 17 at one end of the shank S to provide a mounting therefor. Biasing means for this shank, the same as elsewhere described, exert a constant force thereon, tending to swing it through 90° or more to a fish-impaling position well below the spoon body.

The catch C may also be the same as the one already described. It is shown as a spring wire coiled at one end to fit around the pivot pin 14 which is clamped by its head 16 against the proximate ear 33 so that its forwardly extending portion 27 then lies exteriorly thereof and of the lure body along which it continues to a point oppositely of the shank in its forward end region. A pair of guide openings 30 are provided through the spoon body in a position to receive the bolt 31 which is laterally extended from the catch at the forward end of its section 27. This bolt extends through both openings 30 to be slidingly supported thereby when the catch is in cocked position (FIG. 3), and with capacity to withdraw therefrom to a relaxed position, when triggered. Such a lure, when mouthed by a striking fish, will be subjected to opposite pressures from its two jaws whereby to or of eliminate the frictional resistance which normally holds the bolt in the movement path of the shank. With such resistance reduced the bolt is triggered and the shank freed simultaneously, the latter to execute a fast downward swinging movement to its fish-impaling position.

I claim:

1. A fish lure of the kind wherein an elongated body is provided with line-attaching means near its front end and with a pivotal mounting for one end of a shank whose acting end portion is curved through approximately 180° into the form of a hook, the shank being swingable through a minimum of approximately 90° from a retracted cocked position close to the lure body to a fish-impaling position outwardly and away from the lure body, spring-biasing means associated with the shank and engaging therewith to normally bias it for outward swinging movement through a fixed path whereby its acting end is shifted to a fish-impaling position, and a catch mounted on the lure body and movable through aligned guide openings in the lure body into and out of the movement path of the shank, the shank being maintained in frictional engagement with the catch in response to its own biasing means and adapted to exert a restraining force transversely of the catch to normally hold the latter against movement from its cocked position, a relatively weak biasing means associated with the catch adapted to initiate and complete a retracting movement of the catch in response to opposing pressures from the jaws of a striking fish upon the lure body, whereby the shank is then free to be sprung outwardly to the said fish-impaling position.

2. A fish lure, as specified in claim 1, wherein the catch comprises a locking bolt movable transversely through the said guide openings, the said guide openings tending to prevent bending of the bolt resulting from pressure from the shank applied transversely to the bolt when engagement therebetween takes place.

3. A fish lure, as specified in claim 1, wherein the biasing means for the catch exerts a force of lesser magnitude than that applied to the shank, and wherein the movement paths of the shank and catch are disposed transversely to each other the said guide openings providing a fixed support on which the catch may rest when engaged by the shank.

4. A fish lure, as specified in claim 1, wherein the lure body is provided with a chamber open on its under side for accommodation of the shank and biasing means therefor to permit downward swinging movement of the shank within a vertical plane into and out of fish-impaling position, and wherein the catch is elongated with one end affixed to a side of the body exteriorly thereof near its forward end and with its opposite end formed to swing through a horizontal path.

5. A fish lure, as specified in claim 1, wherein the catch is elongated with one end thereof affixed to the body exteriorly thereof, wherein the swinging movement path of the shank is in a vertical plane and that of the catch is in a horizontal plane, the latter underlying the shank when in its retracted position, one of the guide openings providing a fixed support for the free end of the catch.

6. A fish lure, as specified in claim 1, wherein the movement path of the shank is in a relatively vertical plane, the catch being elongated with one end thereof pivotally anchored to the body exteriorly thereof with the opposite catch end being extended horizontally and transversely of the body and wherein the biasing force for the shank exceeds that for the catch whereby the former will free itself from the latter whenever the biasing force for the shank exceeds the frictional resistance therebetween.

7. A fish lure having an elongated body mounting on its under side a hook whose shank portion is adapted to swing through a relatively vertical movement path from a retracted position close to the lure body and away therefrom downwardly and around to a fish-impaling position therebelow, a catch mounted on the lure body for advancing an acting part thereof through guide openings in the lure body defining a relatively horizontal path transversely of the movement path for the shank in a plane adjacent thereto and therebelow when the shank is in its retracted position, said guide openings providing fixed support means whereon the acting part of the catch may slidably rest when advanced to a position below the shank, and separate biasing means for the shank and catch, the former exerting a greater force than the latter whereby the hook shank is urged downwardly against the catch to transmit thereto a controlled pressure force serving as a frictional brake to restrain sliding movements thereof between the shank and catch.

* * * * *

UNITED STATES PATENT OFFICE
CERTIFICATE OF CORRECTION

Patent No. 3,646,699   Dated March 7, 1972

Inventor(s) Jack R. Zeman

It is certified that error appears in the above-identified patent and that said Letters Patent are hereby corrected as shown below:

Column 3, line 51, "to or of eliminate" should read -- to reduce or eliminate --.

Signed and sealed this 5th day of November 1974.

(SEAL)
Attest:

McCOY M. GIBSON JR.
Attesting Officer

C. MARSHALL DANN
Commissioner of Patents